(12) United States Patent
Millerd (10) Patent No.: US 6,616,075 B1
(45) Date of Patent: Sep. 9, 2003

(54) COMPACT SPICE GRINDER

(75) Inventor: Donald L. Millerd, San Diego, CA (US)

(73) Assignee: Sidney Frank Importing Co., Inc., New Rochelle, NY (US)

( * ) Notice: Subject to any disclaimer, the term of this patent is extended or adjusted under 35 U.S.C. 154(b) by 0 days.

(21) Appl. No.: 10/144,177

(22) Filed: May 13, 2002

(51) Int. Cl.[7] .............................................. B02C 19/12
(52) U.S. Cl. .................... 241/168; 241/169; 241/169.1; 241/DIG. 27
(58) Field of Search .............................. 241/168, 169.1, 241/169, DIG. 27, 169.2

(56) References Cited

U.S. PATENT DOCUMENTS

| | | | |
|---|---|---|---|
| 44,865 A | * 11/1864 | Herrick | 241/167 |
| 274,255 A | * 3/1883 | Barr | 241/169.1 |
| 430,661 A | * 6/1890 | Levi | 241/169.1 |
| 473,051 A | 4/1892 | Abbott | |
| 853,725 A | 5/1907 | Newton | |
| 944,241 A | 12/1909 | Jordan | |
| 4,348,950 A | * 9/1982 | Harris | 241/169.1 |
| 4,366,930 A | * 1/1983 | Trombetti, Jr. | 241/169 |
| 5,118,021 A | * 6/1992 | Fiocchi | 225/103 |
| 5,261,613 A | * 11/1993 | Mullarky | 241/95 |

* cited by examiner

Primary Examiner—John M. Husar
(74) Attorney, Agent, or Firm—Schweitzer Cornman Gross & Bondell LLP (57) ABSTRACT

A compact and efficient spice grinder having a centrally disposed post configured for engaging a spice seed in the grinding chamber. The spice seed is initially "fractured" by a "pestle-like" seed fracturing structuring at the top of the post. When a user thereafter rotates the dome-like cover of the grinder with respect to the base, spice fragments are grated against interior blades positioned along the sidewall of the chamber adapter/extender. A dome cover is gradually lowered by a user as the spice in the grinding chamber becomes depleted. The grinder is lightweight and may be attached conveniently to a key ring or to a chain and carried as a novelty item.

6 Claims, 7 Drawing Sheets

COMPACT SPICE GRINDER

FIELD OF THE INVENTION

The present invention relates generally to hand-held manual spice grinders, and more specifically to an especially compact, lightweight, and portable miniature nutmeg grinder which is very simple to construct and efficient to use.

BACKGROUND OF THE INVENTION

A hand-held manual spice grinder is commonly used for grinding and storing solid spices, e.g. nutmeg and peppercorns. Such a grinder is actuated by an input from a user, commonly a rotational motion such as the turning of a grinder shaft.

A seed of nutmeg is physically different from comparable solid masses of other spices, such as peppercorns. A seed of nutmeg is relatively large, and its outer surface has a bark which is desirable for shredding and then sprinkling onto food and into drinks. The bark may be grated manually, e.g., upon a grating board similar to one for shredding cheese. In contrast, smaller peppercorns are often pulverized, in their entireties, by crushing them between solid surfaces, such as in a mortar by a pestle.

Manual spice grinders configured specifically for shredding whole nutmeg seeds are known in the art. The blades and other shredding surfaces of such nutmeg grinders are generally configured differently than the pulverizing means of spice grinders for other types of spices. U.S. Pat. No. 473,051 to Abbot discloses a hand-held rotary nutmeg "grater" having a grating chamber confined between a top disc and a bottom grating surface. The top disc engages a whole nutmeg seed in a manner whereby the turning of a shaft connected to the top disc rotates the whole nutmeg seed upon the bottom grating surface in order to shred the nutmeg. A coiled spring is provided to compress the seed between the top disc and the bottom grating surface. U.S. Pat. No. 853,725 to Newton discloses a hand-held nutmeg "grater" which has a cylindrical adapter/extender with an external grating surface and an oppositely disposed adapter/extender opening. When a user rubs a whole seed of nutmeg against the external grating surface of the adapter/extender, shredded nutmeg collects in the adapter/extender and is dispensed through the adapter/extender opening. U.S. Pat. No. 944,241 to Jordan discloses a hand-held rotary nutmeg "grater" similar to the Abbott device. A whole nutmeg seed is shredded between parallel upper and lower grating discs, after which nutmeg shreds are dispensed through outlets positioned along the sides of the grater. A coiled spring applies a downward force on the upper disc, thus pressing the seed against the shredding blades.

It is the object of the present invention to provide a manual nutmeg grinder which is more compact and easily portable; constructed of fewer parts; simpler to use; less likely to cause injury to a user; and more efficient, i.e., requiring less effort by the user to shred the nutmeg, than devices heretofore known in the art.

SUMMARY OF THE INVENTION

The present invention is an improved nutmeg grinder which is extremely compact, consuming little space. The improved grinder is lightweight and very portable. It includes only four components, all of which are durable, economically manufactured from plastics, and may be assembled easily. It is simple to use and grates a whole seed of nutmeg efficiently. Moreover, it advantageously functions without a spring or any other similar mechanical device. As a particularly desirable feature of the present lightweight grinder, it may be easily mounted to a key ring or a chain, e.g., a necklace, and then carried around as a novelty item.

The present grinder has a specially configured integral pestle-like seed-fracturing structure positioned internally, proximate a plurality of parallel internal linear grating blades in close proximity to each other along the sidewall of an internal grinding chamber. A rotating disc selectively opens and closes apertures in communication with the grinding chamber for preventing shredded nutmeg from escaping or leaking out. The components of the grinder are safe to use and advantageously lack sharp metallic blades.

In contrast to prior art "graters" which grind nutmeg as whole seeds, the present grinder instead provides two separate and distinct "actions" for grinding a whole nutmeg seed. First, the nutmeg seed is broken upon the internal seed-fracturing structure. Second, the broken pieces of nutmeg are shredded upon the linear grating blades by turning the cover of the grinder with respect to the base. A displaceable mortar-like cover including crushing ribs may be gradually lowered by a user as the spice in the grinding chamber becomes depleted, urging additional nutmeg pieces into the grinding chamber.

The foregoing and other advantages of the improved nutmeg grinder of the present invention will become apparent in the following detailed description of the invention, with further reference being made to the accompanying drawings.

DETAILED DESCRIPTION OF PREFERRED EMBODIMENT

Figures 1, 2:
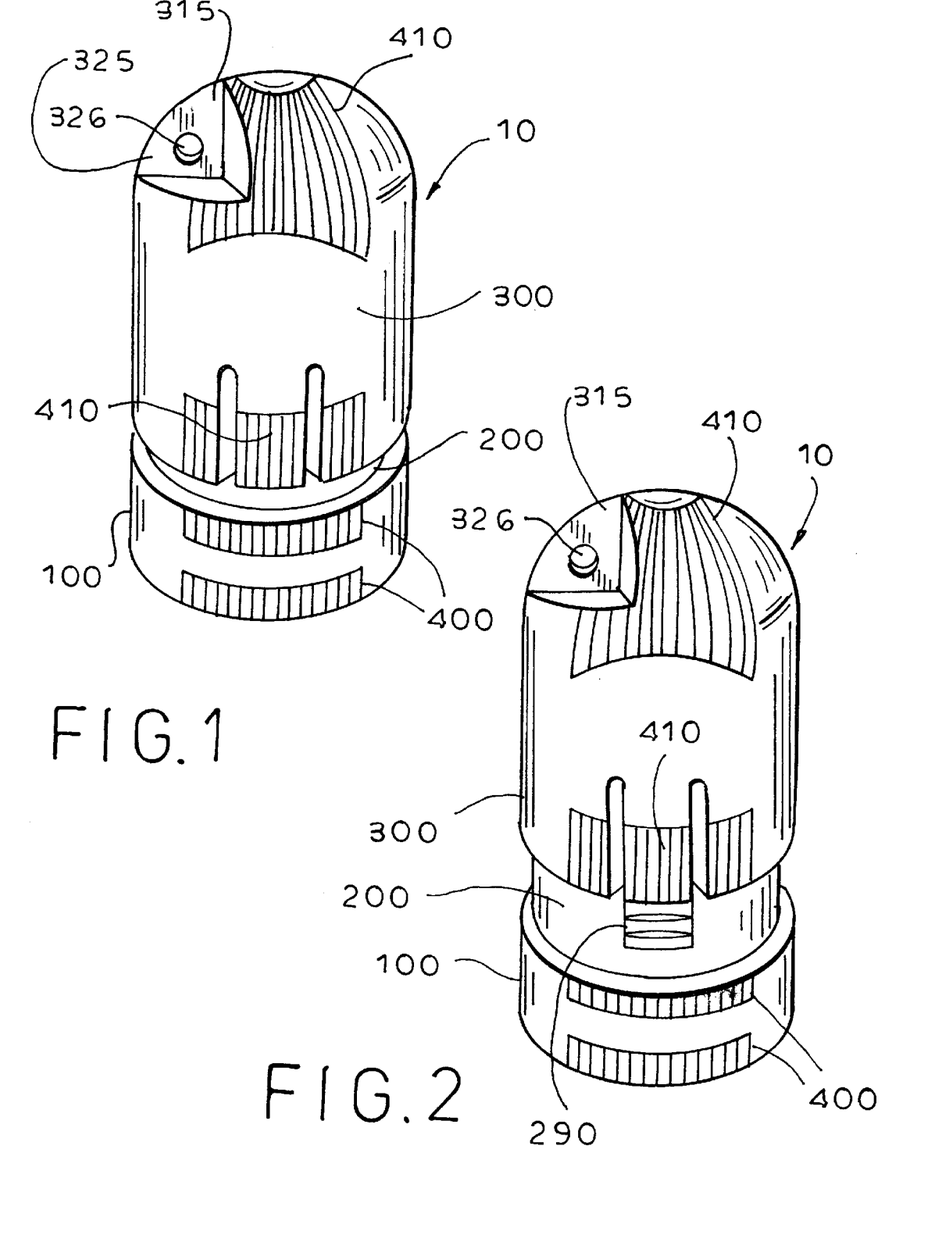
FIG. 1 is a perspective view of the grinder of the present invention.
FIG. 2 is a perspective view of the grinder of FIG. 1, in which the dome cover of the grinder is in a "raised" position.
Figure 3:
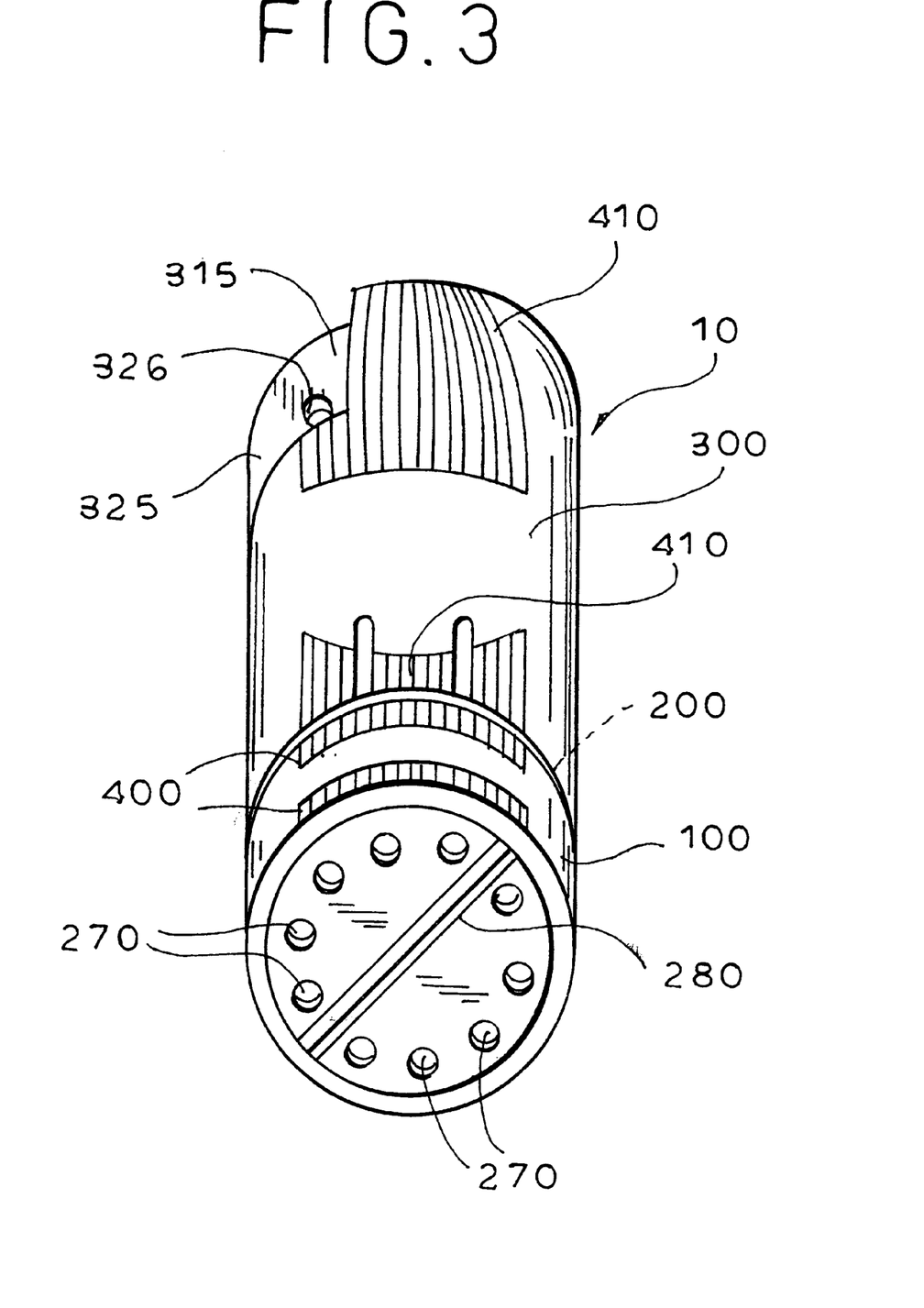
FIG. 3 is a perspective view of the grinder of FIG. 1 rotated by 90 degrees about its radial axis.

As shown in FIGS. 1–3, the present invention is a compact and lightweight spice grinder that may be used to crush and shred a seed of nutmeg quickly and efficiently. The spice grinder 10 has three fundamental components: a base 100 having a centrally disposed and upwardly projecting internal post member 110 with a "pestle-like" peak 115 (shown in FIGS. 4B, 6–8), a adapter/extender 200, and a "mortar-like" upper dome 300 positioned to provide a removable cover for the adapter/extender 200. Both the adapter/extender 200 and dome 300 are rotatable, as a single combined unit, with respect to the base 100 in order to shred nutmeg.

All components of the present nutmeg grinder are preferably composed of hard and lightweight plastics to provide durability and economy. The grinder is substantially cylindrical and has outer dimensions of only approximately two inches in total length and one inch in diameter.

The outer surface of the upper dome 300 of the grinder 10 has a channel-like groove 315 having a depth of approximately one-half inch. A mounting plate 325 having an aperture 326 is positioned in the groove 315. The grinder may be attached to a key ring or a chain by inserting the ring or chain into the aperture 326. The presence of the groove 315 permits the grinder to travel easily along the ring (or chain) while providing a structure which advantageously lacks any protrusions on the surface of the dome. Also in the present configuration, the dome cover 300 remains conveniently attached to the chain when the cover 300 is removed from the grinder 10, e.g., to insert a fresh nutmeg seed. On the inner surface of the dome, four crushing ribs 304 project downwardly at 45 degree angles.

The dome 300 may be secured in various positions, or "heights," upon the adapter/extender 200. For example, the dome 300 is shown in a "higher" position in FIG. 2 than in FIG. 1, providing additional space between the internal pestle-like post 110 and the mortar-like dome cover 300. Upon inserting a fresh nutmeg seed N into the grinder 10, the dome 300 is initially sufficiently high to provide enough space between itself and the post 110 for a nutmeg seed to be secured therebetween. After inserting a whole nutmeg seed into the grinder 10, a user fractures the seed by applying a pressure to the dome 300, thus pressing the crushing ribs 304 and breaking the seed against the pestle-like peak 115 of the post 110. Broken pieces of nutmeg fall into the region of the grinder between the adapter/extender 200 and the post 110, i.e., the grinding chamber 210 (shown in FIGS. 4 and 5). A subsequent pressure against the dome 300 urges additional pieces of nutmeg into the grinding chamber while lowering the height of the cover 300 with respect to the adapter/extender 200 and base 100. A user may continue to urge the dome 300 closer to the base while shredding the nutmeg, causing the dome cover to translate go progressively to a lower position.

Figure 4A:
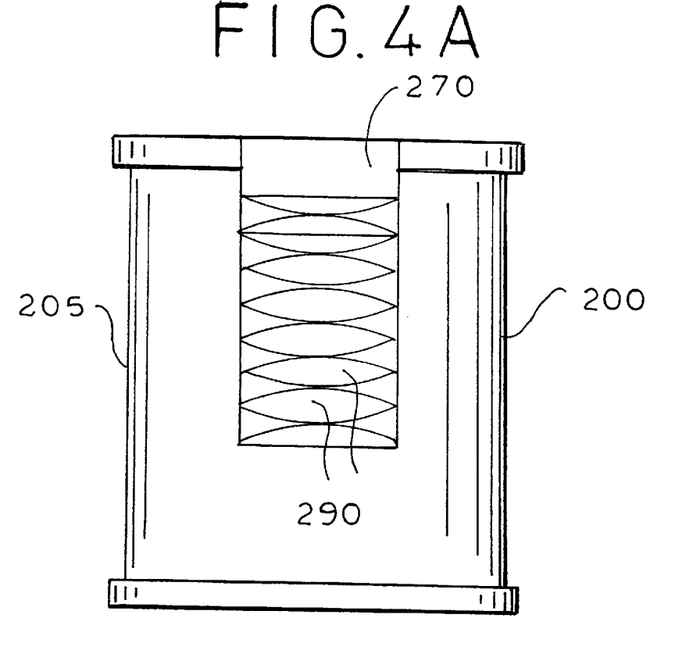
FIG. 4A is an enlarged side view of the adapter/extender of the grinder assembly of the present invention.
Figure 4B:
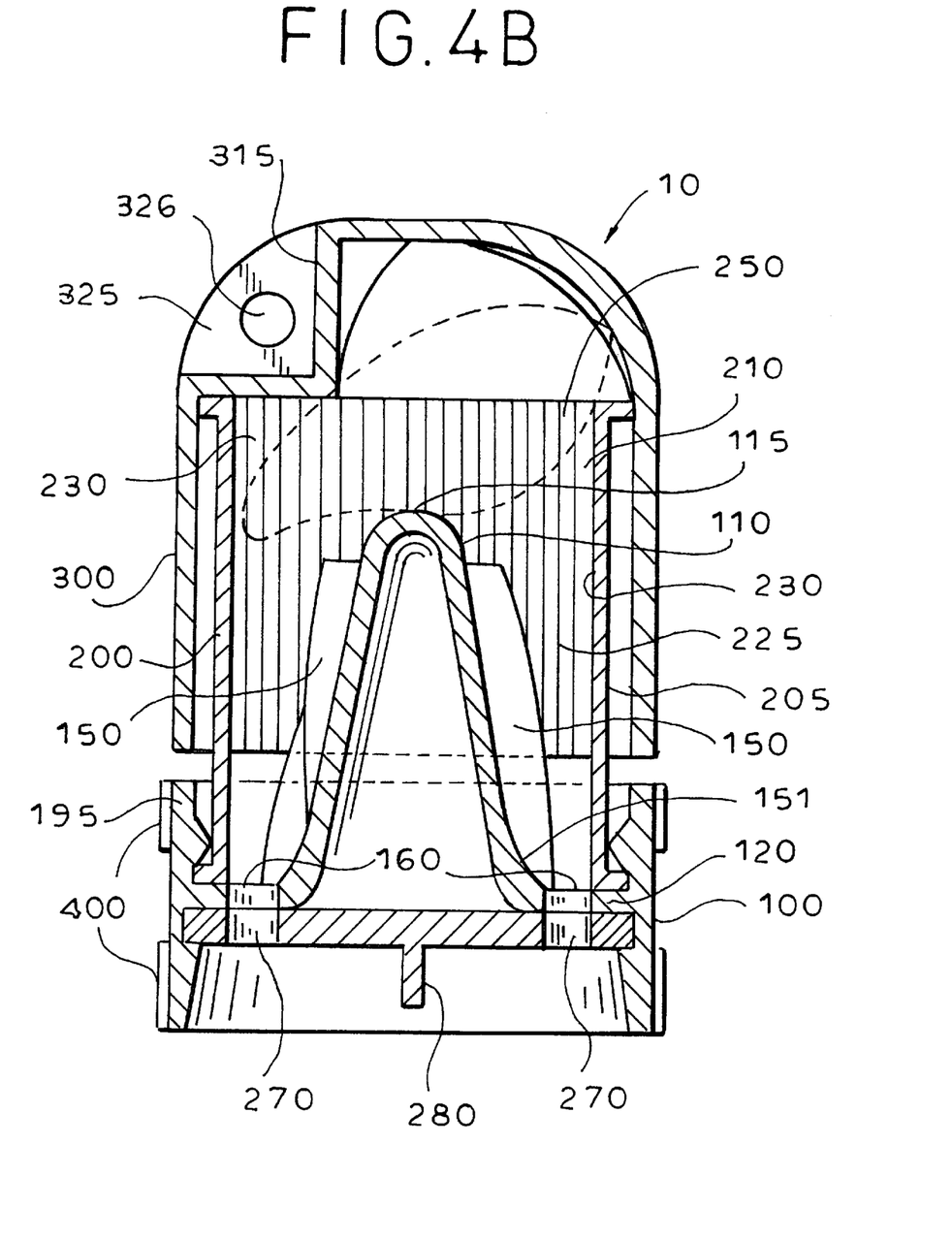
FIG. 4B is a vertical cross-sectional view of the assembled grinder of the invention.
Figure 5:
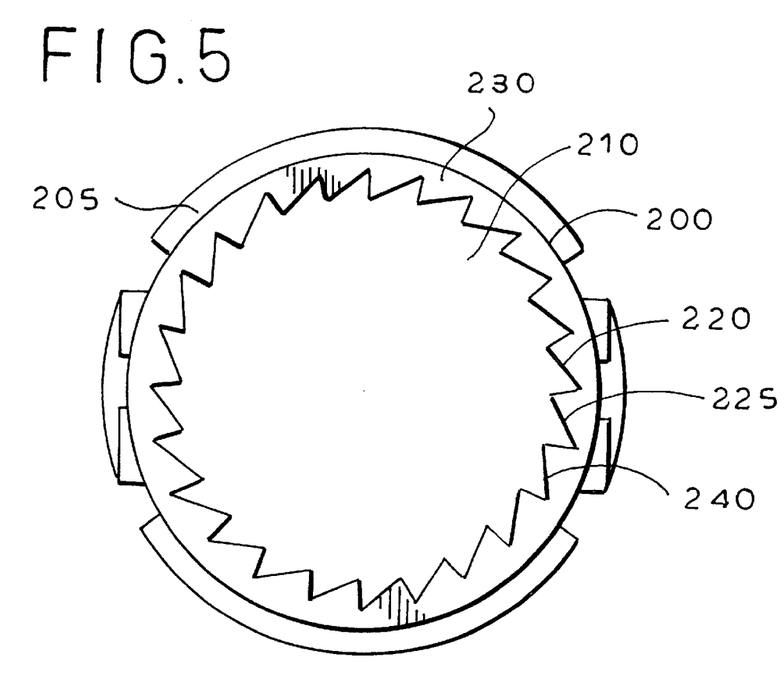
FIG. 5 is an enlarged bottom view of the adapter/extender of FIG. 4.
Figure 6:
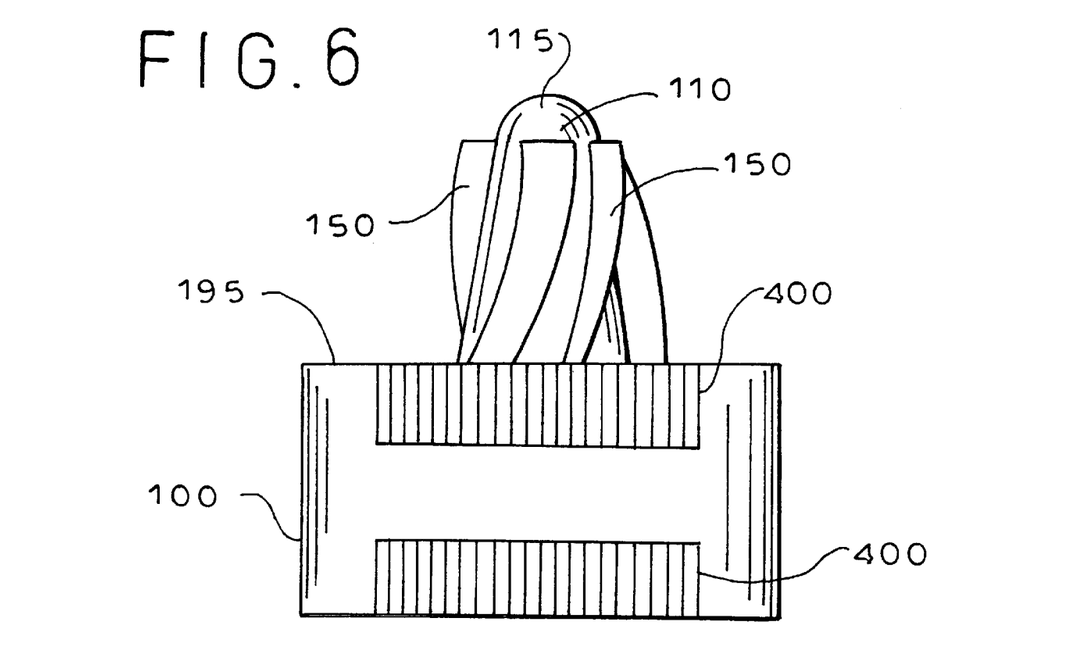
FIG. 6 is an enlarged side view of the base of the grinder.
Figure 7:
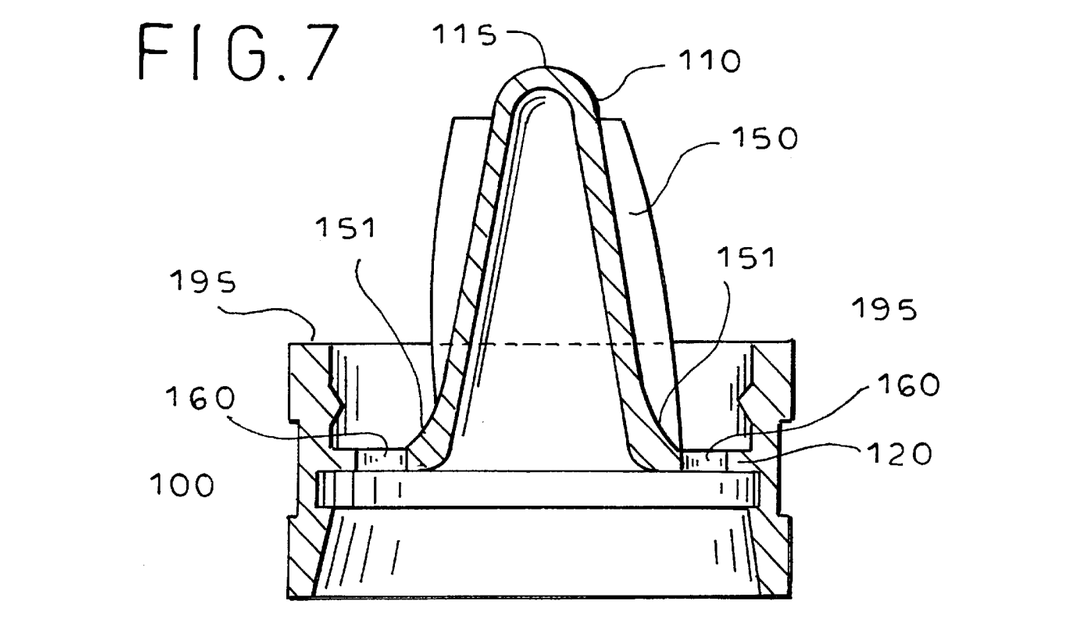
FIG. 7 is a sectional view of the base taken along the line 7—7 in FIG. 6.
Figure 8:
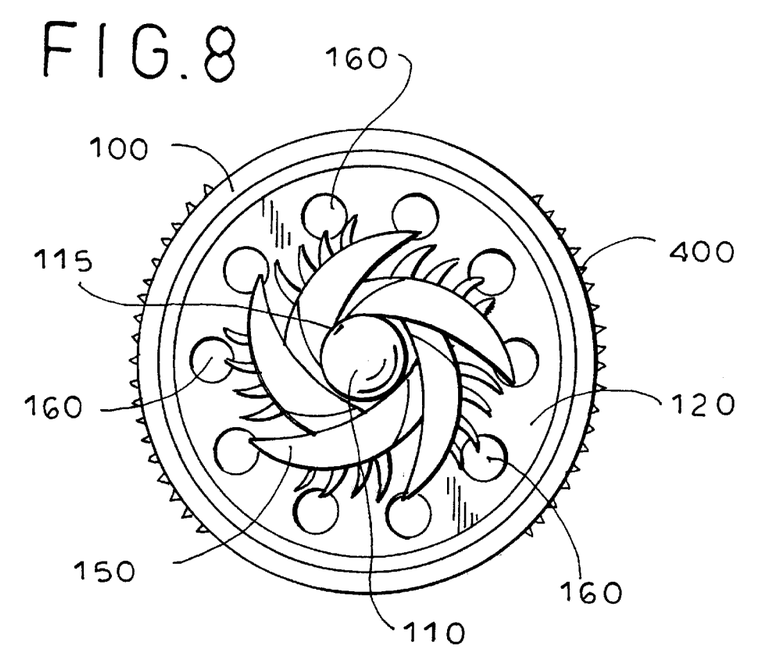
FIG. 8 is an enlarged top view of the base of FIG. 6.
Figure 9:
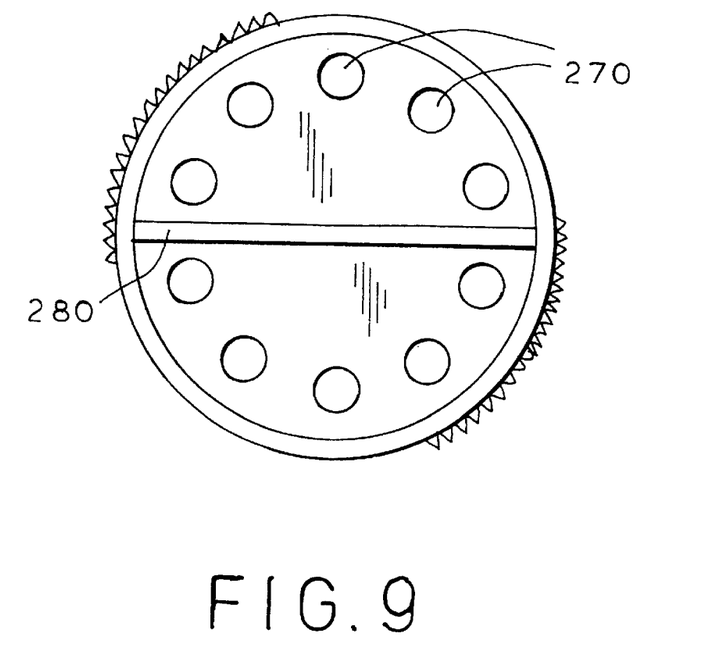
FIG. 9 is an enlarged bottom view of the base of FIG. 6 with an integral rotating disc.

As shown in FIGS. 4 and 5, the adapter/extender 200 has a substantially cylindrical wall 205 providing an interior grinding chamber 210 for grating a seed of nutmeg. A plurality of inwardly extending blades 220 along the inner surface 230 of the adapter/extender 200 are parallel to each other and to the longitudinal axis of the adapter/extender 200. Each blade has a triangular and asymmetric cross-section 225, permitting the shredding of a seed of nutmeg only when the adapter/extender 200 is rotated in one direction with respect to the base 100, but not in the other direction. Each blade 220 has a leading edge 240, the width (and sharpness) of which may be selected to provide a blade which is sufficiently sharp for shredding nutmeg but not so sharp that it might otherwise present a hazard to its user. The blades 220 protrude relatively little from the adapter/extender inner surface 230 in order to minimize the risk of injury to the user.

The adapter/extender 200 has an upper entry 250 for the insertion of a seed of nutmeg into the grinder 10 and has a lower exit 260 out of which shredded nutmeg is dispensed from the grinding chamber 210. The cylindrical wall 205 of the adapter/extender 200 has two raised external mounting regions 280 positioned opposite each other along the cylindrical wall 205. Each external mounting region 280 has a plurality of teeth 290 for engaging and securing the dome cover 300 in various "heights" with respect to the adapter/extender 200. Each raised mounting region 280 is inserted into a respective channel of the dome cover 300, preventing rotation of the dome cover 300 with respect to the adapter/extender 200 and causing the adapter/extender 200 and cover 300 to rotate as a single unit with respect to the base 100.

As shown in FIGS. 6–9, a specially configured base 100 includes a lower platform 120 and a rigid, upwardly projecting, and centrally disposed post 110. The integral post 110 extends upwardly from the platform 120 into the grinding chamber 210 of the adapter/extender 200. The post 110 is preferably conical with a "pestle-like" peak 115, providing a seed-fracturing structure. The peak 115 is positioned proximate the cushioning ribs 304 in the hemispherical "mortar-like" dome 300.

A series of helical ribs 150 extend outwardly from the post 110. The ribs 150 are configured to engage nutmeg fragments, to press them against the inner surface 230 of the adapter/extender wall 205, and to carry the fragments across the blades 220 in the grinding chamber 210 (after the nutmeg seed is first broken against the seed-fracturing structure). Apertures 160 are positioned along the base 110 to permit the dispensing of shredded nutmeg out of the grinding chamber 210. A rotating disc 280 is beneath and adjacent to the base for selectively covering the apertures 160. Specifically, the rotating disc 280 includes a series of disc apertures 270 which are selectively registered or unregistered with the apertures 160 of the base.

The helical ribs 150 are preferably oriented "downwardly" upon the post 110. As a result, the nutmeg fragments are urged downwardly toward the base 100 as the grinder adapter/extender 200 and cover 300 are rotated with respect to the base 110. Specifically, as a user turns the grinder in order to grind nutmeg, the nutmeg fragments in the grinding chamber 210 (a) become smaller and (b) travel down towards the base 100 of the grinder. Because the cross-sectional open area of the grinding chamber 210 (i.e., the open area between the adapter/extender and the post) decreases deeper into the chamber because of the conical shape of the post, a nutmeg piece is permitted to move deeper only after being shredded to a sufficiently small size. Thus the nutmeg pieces become progressively smaller as they are ground, traveling downwardly towards the base 100 until ground nutmeg is dispensed out of the base apertures 160. At the bottom region of the post 110 are secondary ribs 151 which are positioned very near the inner surface 230 of the adapter/extender 200, pressing very small pieces of nutmeg against the shredding blades for grinding.

The present grinder is easily assembled by mounting the adapter/extender 200 to the base and by mounting the rotating disc to the base, both within the sidewall 195 of the base. Specifically, the adapter/extender has a stepped-down region 155 for rotating within the sidewall of the base. The stepped-down region of the adapter/extender has a lower lip 158 which is "snap-fit" and secured within the sidewall, permitting the rotation of the base and adapter/extender with respect to each other. The rotating disc is similarly snap-fit within inner groove of the sidewall.

Figure 10:
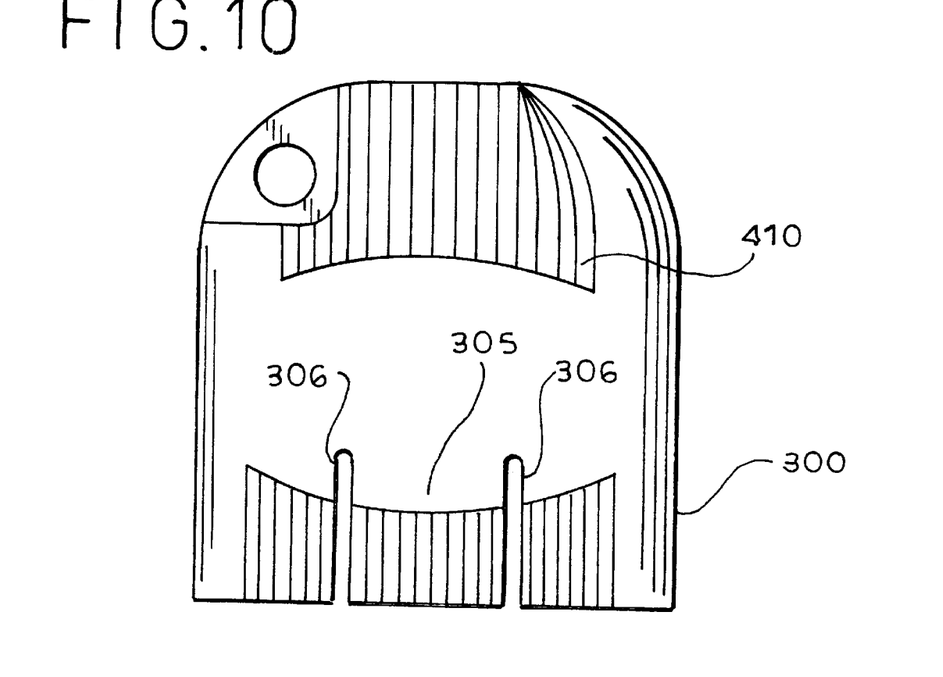
FIG. 10 is an enlarged side view of the dome (cap) of the grinder of the present invention.
Figure 11:
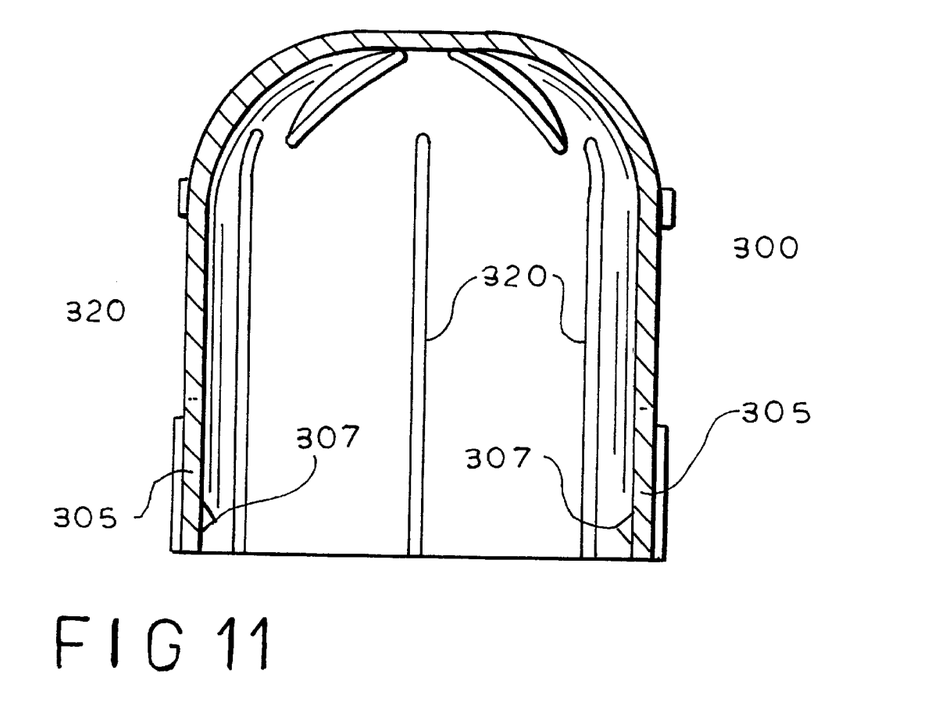
FIG. 11 is a sectional view of the dome taken along the line 11—11 of FIG. 10.

The dome cover 300 is shown in FIGS. 10 and 11. The cover 300 is releasably retained by the adapter/extender 200 proximate its entrance by a flexible finger 305, an inner tooth 307 of which engages a respective outer tooth 290 of the external mounting region 280 of the adapter/extender 200. Slots 306 in the cover permit the fingers 305 to bend slightly with respect to the cover 300, and provide the fingers with a degree of elasticity for engaging the teeth 290 of the adapter/extender. Interior channels 320 of the cover 300 are sized and shaped to receive the raised external mounting regions 280 of the adapter/extender 200 for preventing rotation of the dome cover 300 with respect to the adapter/extender 200, causing the adapter/extender 200 and cover 300 to rotate as a single unit with respect to the base. The dome 300 is easily removed from the adapter/extender to permit the insertion of a seed of nutmeg into the grinder. When attached to the adapter/extender, the dome 300 shields the grinding chamber in order to prevent contaminants and the like from entering the grinding chamber.

The base and dome have respective external gripping means 400, 410 for the user to grip comfortably and securely while grinding nutmeg by rotating the dome and adapter/extender with respect to the base.

In use, a nutmeg seed is inserted into the adapter/extender 200, and the dome 300 is placed upon the adapter/extender. The whole nutmeg seed is initially held between the "mortar-like" dome and the "pestle-like" post. A simple compression of the seed between the two structures, e.g., by pressing together the dome and base of the grinder or by hitting the base of the grinder against a table, breaks the nutmeg seed into pieces within the "mortar-like" dome. Pieces of the broken seed fall into the grinding chamber along the sides of the central post. Thereafter, rotation of the dome and adapter/extender with respect to the base grinds the broken pieces of nutmeg. Specifically, the helical ribs of the post engage the broken nutmeg pieces and carry them across the plurality of linear, inwardly extending blades of the inner surface of the adapter/extender. If the rotating disc is registered with the apertures of the base, then ground nutmeg is dispensed out of the grinder through apertures along the base of the grinder.

The conical shape of the integral post member advantageously obviates any need for a spring and/or other compressing mechanical component to vary the size of the grinding chamber as the nutmeg seed diminishes in size. In the present grinder, as the fragments of broken nutmeg become smaller while being ground, those fragments are permitted to fall deeper into the grinding chamber (as long as the grinder is upright). The fragments advantageously remain pressed against the inner surfaces of the adapter/extender (thus pressed against the internal grinding blades) at all times, obviating any need for a compression means otherwise to press the nutmeg pieces against the grinding blades.

It is also appreciated that the presence of multiple smaller nutmeg fragments positioned between the post and the adapter/extender sidewall increases the effective surface area of nutmeg being ground at any one time, reducing the amount of effort required of a user to produce a given amount of nutmeg.

The present nutmeg grinder, due to its simplicity and economy, is well suited for use in marketing products in association with which a ground spice might be used, e.g., by distributing it as a giveaway "premium item" with a trademark prominently stamped thereon. Ground nutmeg is often an ingredient in mixed alcoholic drinks.

Although preferred embodiments of the grinder of the present invention have been disclosed for illustrative purposes, those who are skilled in the art will appreciate that various modifications, additions and substitutions are possible without departing from the scope and spirit of the invention as set forth in the accompanying claims. For example, the adapter/extender may be enlarged or modified in size to adapt it for spices of different shapes and sizes than those of nutmeg.

I claim:

1. A compact spice grinder comprising:
   a. a base having
      A. a platform having at least one aperture;
      B. a post ember projecting from said platform and having at least one rib extending outwardly of said post member; and
      C. a seed-fracturing structure upon said post member;
   b. a adapter/extender having
      A. an interior grinding chamber sized for receiving a seed of spice;
      B. an upper entry for the insertion of a seed of spice into said grinding chamber;
      C. a lower exit for the dispensing of ground nutmeg out of said grinding chamber;
      D. a longitudinal axis extending centrally in said grinding chamber between said upper entry and lower exit; and
      E. an inner surface having a plurality of inwardly extending blades proximate said grinding chamber for grinding the seed of spice;
      F. a means for telescopically securing said dome in at least two different heights with respect to said adapter assembly; and
   c. an upper dome releasably connected to said adapter/extender proximate said adapter/extender upper entry; whereby the seed of spice may be broken between said seed-fracturing structure and said upper dome by a compression of said dome and said base.

2. The spice grinder of claim 1, wherein said projecting post member has a conical shape which is wider proximate said platform.

3. The spice grinder of claim 1, wherein said seed-fracturing structure has a hemispherical shape.

4. The spice grinder of claim 1, wherein said base has two ribs extending helically about said post member.

5. The spice grinder of claim 1, wherein said dome has means for attachment to a chain.

6. The spice grinder of claim 5, wherein said means for attachment comprises an external channel and a mounting plate positioned in said channel, the mounting plate having a thru-way for inserting the chain therethrough.

* * * * *